United States Patent
Sprecher (10) Patent No.: US 11,651,381 B2
(45) Date of Patent: May 16, 2023

(54) MACHINE LEARNING FOR MARKETING OF BRANDED CONSUMER PRODUCTS

(71) Applicant: Catalina Marketing Corporation, St. Petersburg, FL (US)

(72) Inventor: Benjamin S. Sprecher, Waban, MA (US)

(73) Assignee: Catalina Marketing Corporation, St. Petersburg, FL (US)

( * ) Notice: Subject to any disclaimer, the term of this patent is extended or adjusted under 35 U.S.C. 154(b) by 0 days.

(21) Appl. No.: 17/572,299

(22) Filed: Jan. 10, 2022

(65) Prior Publication Data

US 2022/0207542 A1 Jun. 30, 2022

Related U.S. Application Data

(62) Division of application No. 16/013,719, filed on Jun. 20, 2018, now Pat. No. 11,222,347.

(Continued)

(51) Int. Cl.
*G06Q 30/02* (2012.01)
*G06N 3/08* (2006.01)
(Continued)

(52) U.S. Cl.
CPC ......... *G06Q 30/0202* (2013.01); *G06F 16/26* (2019.01); *G06F 16/285* (2019.01);
(Continued)

(58) Field of Classification Search
CPC ......... G06Q 30/0633; G06Q 10/06315; G06Q 30/0202; G06N 3/08
See application file for complete search history.

(56) References Cited

U.S. PATENT DOCUMENTS 6,684,195 B1   1/2004  Deaton et al.
8,055,663 B2  11/2011  Tsai et al.
(Continued)

FOREIGN PATENT DOCUMENTS

JP   2011-070396 A   4/2011
WO  2000-039725 A2   7/2000

OTHER PUBLICATIONS

Grbovic et al., "E-commerce in Your Inbox: Product Recommendations at Scale," 2015 ACM, arXIV:1606.07154v1, retrievable from https://astro.temple.eduHuc17157/pdfs/grbovic2015kddB.pdf, 10 pages.

(Continued)

*Primary Examiner* — Deirdre D Hatcher
(74) *Attorney, Agent, or Firm* — McDermott Will & Emery LLP (57) ABSTRACT

A method including retrieving a product information from a database is provided. The method includes associating the product information with multiple classification values, forming a vector associated with a consumer product. The classification values form coordinates of the vector in a vector space that comprises multiple vectors associated with multiple consumer products. The method includes determining a cluster in the vector space, including at least one vector selected according to a relative distance within a cluster boundary. The method includes selecting a discriminator vector from a vector difference between a first vector in a first cluster in the vector space and a second vector in a second cluster in the vector space and identifying a new consumer product associated with a new vector that is formed by adding the discriminator vector to a third vector from the vector space, the third vector associated with a known consumer product.

18 Claims, 6 Drawing Sheets

Related U.S. Application Data (60) Provisional application No. 62/522,582, filed on Jun. 20, 2017.

(51) Int. Cl.

| | | |
|---|---|---|
| *G06Q 30/0202* | (2023.01) | |
| *G06Q 10/0631* | (2023.01) | |
| *G06F 16/28* | (2019.01) | |
| *G06F 16/26* | (2019.01) | |
| *G06N 3/04* | (2023.01) | |
| *G06N 3/088* | (2023.01) | |
| *G06Q 30/0601* | (2023.01) | |

(52) U.S. Cl.
CPC ......... *G06N 3/0454* (2013.01); *G06N 3/0472* (2013.01); *G06N 3/08* (2013.01); *G06N 3/088* (2013.01); *G06Q 10/06315* (2013.01); *G06Q 30/0633* (2013.01)

(56) References Cited

U.S. PATENT DOCUMENTS

| | | |
|---|---|---|
| 8,171,025 B2 | 5/2012 | Tsai et al. |
| 9,501,551 B1 | 11/2016 | Weissgerber et al. |
| 9,760,802 B2 | 9/2017 | Chen et al. |
| 10,521,824 B1 | 12/2019 | Boshy et al. |
| 2002/0107858 A1 | 8/2002 | Lundahl et al. |
| 2009/0248599 A1 | 10/2009 | Hueter et al. |
| 2011/0035379 A1 | 2/2011 | Chen et al. |
| 2011/0184806 A1 | 7/2011 | Chen et al. |
| 2014/0181121 A1 | 6/2014 | Nice et al. |
| 2015/0142521 A1 | 5/2015 | Aydin et al. |
| 2017/0177993 A1 | 6/2017 | Draelos et al. |

OTHER PUBLICATIONS

Tani Elian et al., "Adversarial Training ofWord2Vec for Basket Completion," arXiv:1805.08720v1, submitted May 22, 2018 for RecSvs '18, Oct. 2018, Vancouver, Canada, 5 pages.

ISA/KR—International Search Report and Written Opinion Report for related International Appln. No. PCTUS2018038567, dated Oct. 19, 2018, 13 pgs.

ISA/KR—International Preliminary Report on Patentability for related International Appln. No. PCTUS2018038567, dated Jan. 2, 2020, 10 pgs.

A Comparative Analysis of Neural Networks and Statistical Methods for Predicting Consumer Choice; West et al; Nov. 1, 1997 (Year: 1997).

Identifying Consumer's Preferences Using Artificial Neural Network Techniques; Matsatsinis et al; 1998 (Year: 1998).

Predicting online user behaviour using deep learning algorithms; Vieira; May 27, 2016 (Year: 2016).

MACHINE LEARNING FOR MARKETING OF BRANDED CONSUMER PRODUCTS

CROSS-REFERENCE TO RELATED APPLICATIONS

This application claims priority under 35 U.S.C. § 121 as a divisional of U.S. patent application Ser. No. 16/013,719, filed Jun. 20, 2018, entitled "MACHINE LEARNING FOR MARKETING OF BRANDED CONSUMER PRODUCTS," by Benjamin S. Sprecher, now allowed, which claims the benefit of priority under 35 USC 119(e) to U.S. Provisional Patent Application 62/522,582 entitled "MACHINE LEARNING FOR MARKETING OF BRANDED CONSUMER PACKAGED GOODS," by Benjamin S. Sprecher filed on Jun. 20, 2017, the contents of which are incorporated by reference herein in their entirety, for all purposes.

BACKGROUND

Field

The present disclosure generally relates to systems for marketing branded consumer products based on robust historical input and predictive analysis. More specifically, the present disclosure relates to systems for selecting consumer packaged goods to predict the contents of a shopping basket and to influence consumer behavior and product sales in retail stores.

Description of the Related Art

Product brands and retailers face a number of challenges in trying to drive higher sales and profits. From inefficient and poorly-targeted advertising, to poor promotion design.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

SUMMARY

In a first embodiments, a computer-implemented method is described that includes retrieving a product information from a database, the product information associated with a consumer product. The computer-implemented method includes associating the product information with multiple classification values, and forming a vector associated with the consumer product. Each of the classification values forms a coordinate of the vector in a vector space that comprises multiple vectors associated with multiple consumer products. The computer-implemented method includes determining at least one cluster in the vector space, the cluster including at least one vector selected according to a relative distance within a cluster boundary and selecting a discriminator vector from a vector difference between a first vector in a first cluster in the vector space and a second vector of a second cluster in the vector space. The computer-implemented method also includes identifying a new consumer product associated with a new vector that is formed by adding the discriminator vector to a first vector from the vector space, the first vector associated with a known consumer product.

In a second embodiment, a system is disclosed that includes a memory including instructions, and one or more processors configured to execute the instructions to retrieve a product information from a database, the product information associated with a consumer product. The one or more processors also execute instructions to associate the product information with multiple classification values and to form a vector associated with the consumer product, the vector having the classification values as coordinates in a vector space comprising multiple vectors associated with multiple consumer products. The one or more processors also execute instructions to determine at least one cluster in the vector space, the cluster including at least one vector selected according to a relative distance within a cluster boundary, to select a discriminator vector from a vector difference between a first vector in of a first cluster in the vector space and a second vector in a second cluster in the vector space, and to identify a new consumer product associated with a new vector that is formed by adding the discriminator vector to a first vector from the vector space, the first vector associated with a known consumer product.

In yet another embodiment, a computer-implemented method is disclosed that includes training, to simulate a shopping basket based on a plurality of classification values from a vector space, a first neural network. The vector space includes multiple vectors, each vector associated with a product having at least one of the plurality of classification values. The computer-implemented method includes training the first neural network according to a consumer data from a selected consumer information or from an aggregated information from a consumer population, and training, to detect whether or not a shopping basket is simulated or exist in a retailer database, a second neural network. The computer-implemented method also includes determining with the second neural network whether the shopping basket from the first neural network passes a threshold value, the threshold value indicative of whether a shopping basket is simulated or not. The computer-implemented method includes modifying the first neural network when the shopping basket passes the threshold value and modifying the second neural network when the shopping basket fails the threshold value.

In one embodiment, a system is disclosed that includes a means for storing instructions, and a means to execute the instructions to retrieve a product information from a database, the product information associated with a consumer product. The means to execute instructions also executes instructions to associate the product information with multiple classification values and to form a vector associated with the consumer product, the vector having the classification values as coordinates in a vector space comprising multiple vectors associated with multiple consumer products. The means to execute instructions also executes instructions to determine at least one cluster in the vector space, the cluster including at least one vector selected according to a relative distance within a cluster boundary, to select a discriminator vector from a vector difference between a first vector in a first cluster in the vector space and a second vector in a second cluster in the vector space, and to identify a new consumer product associated with a new vector that is formed by adding the discriminator vector to a first vector from the vector space, the first vector associated with a known consumer product.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

In the following detailed description, numerous specific details are set forth to provide a full understanding of the present disclosure. It will be apparent, however, to one ordinarily skilled in the art that embodiments of the present disclosure may be practiced without some of these specific details. In other instances, well-known structures and techniques have not been shown in detail so as not to obscure the disclosure.

General Overview

Marketing tools used for optimizing the sales of consumer products in the market place by brand manufacturers and retail stores alike are often ineffective, as they are typically based on demographic data for users, rather than personalized purchasing history and habits, aggregated over large populations. For example, in some cases, the lack of understanding of consumer responsiveness to advertising campaigns or other strategies (e.g., bargains and reduced prices) may result in offering a product for a price that is lower than desirable, when the consumer would be as likely to purchase the product for a higher price.

Embodiments as disclosed herein address the problem arising in computer technology of finding optimal inventory strategies and pricing values for a wide variety of consumer products with a robust model for consumer behavior consisting of (a) a system for quantifying and encoding the latent attributes and qualities of products, (b) a method for translating between actual baskets of products and the encoded attributes of those products, and (c) a method for predicting future purchases of shoppers in terms of those latent product attributes. The solution includes adjusting the features in a core engine as provided above according to the latent attributes of consumer products to optimize a profit value, or sales revenue, and to prevent out-of-stock situations, and optimize product distribution and assortment in a store.

In embodiments as disclosed herein, a computer processor performs an automated vector-based classification of consumer products. The automated vector-base classification results in clustering and attribute extraction of the consumer products according to relevant marketing parameters. Then, a generative adversarial network (GAN) may be used to create a shopping basket prediction model. A shopper behavior may be predicted with the shopping basket prediction model together with the clustering classification of consumer products (at the individual or population levels).

In embodiments consistent with the present disclosure, an advertising and marketing technology system uses a vector representation of multiple consumer products in a vector space and applies methods to predict the contents and value of a shopping basket as a function of pre-selected input variables. In some embodiments, an input variable may include controllable signals such as a price value of a product or multiple consumer products, or placement of advertisements in a store, or in the media, or through a computer network. More generally, the input variables may include availability of coupons, and other intra-store controllable conditions (e.g., temperature, illumination, interior color and decoration, promotional activity such as endcaps and displays, store layouts and planograms, stock levels by store, and the like). In some embodiments, the pre-selected input variables may include uncontrollable signals, such as weather conditions, day of week or proximity to holidays or paydays or monthly benefit payment dates, or other social parameters and indicators (e.g., job market, domestic product growth, exchange rate, and the like).

Further, some embodiments include methods in the vector space to understand and predict a behavior and responsiveness of a consumer with regard to pre-selected, controllable input variables such as product assortment, price, promotion, incentives (e.g., coupons), and advertisement. The consumer behavior may include increased or decreased shopping basket value, increased or decreased degree of brand or retail store loyalty (e.g., purchasing frequency, and the like), and increased or decreased frequency of shopping trips to a retail store. Another consumer behavior of interest may include a propensity to try a new product or brand.

The disclosed system addresses this problem specifically arising in the realm of computer technology by providing a solution also rooted in computer technology, namely, the use of the vector space to apply neural networks and machine learning algorithms to modify an existing product or create a new product that enhances the value of a shopping basket for a consumer, or a section of the consumer population.

The subject system provides several advantages including providing an engine that enables the processing of aggregated historical and population data for consumers to create the vector space. In some embodiments, the dimensionality of the vector space is determined by a product characteristic or classifier as determined from the aggregated historical and population data by using a neural network or machine-learning algorithm.

Figure 1:
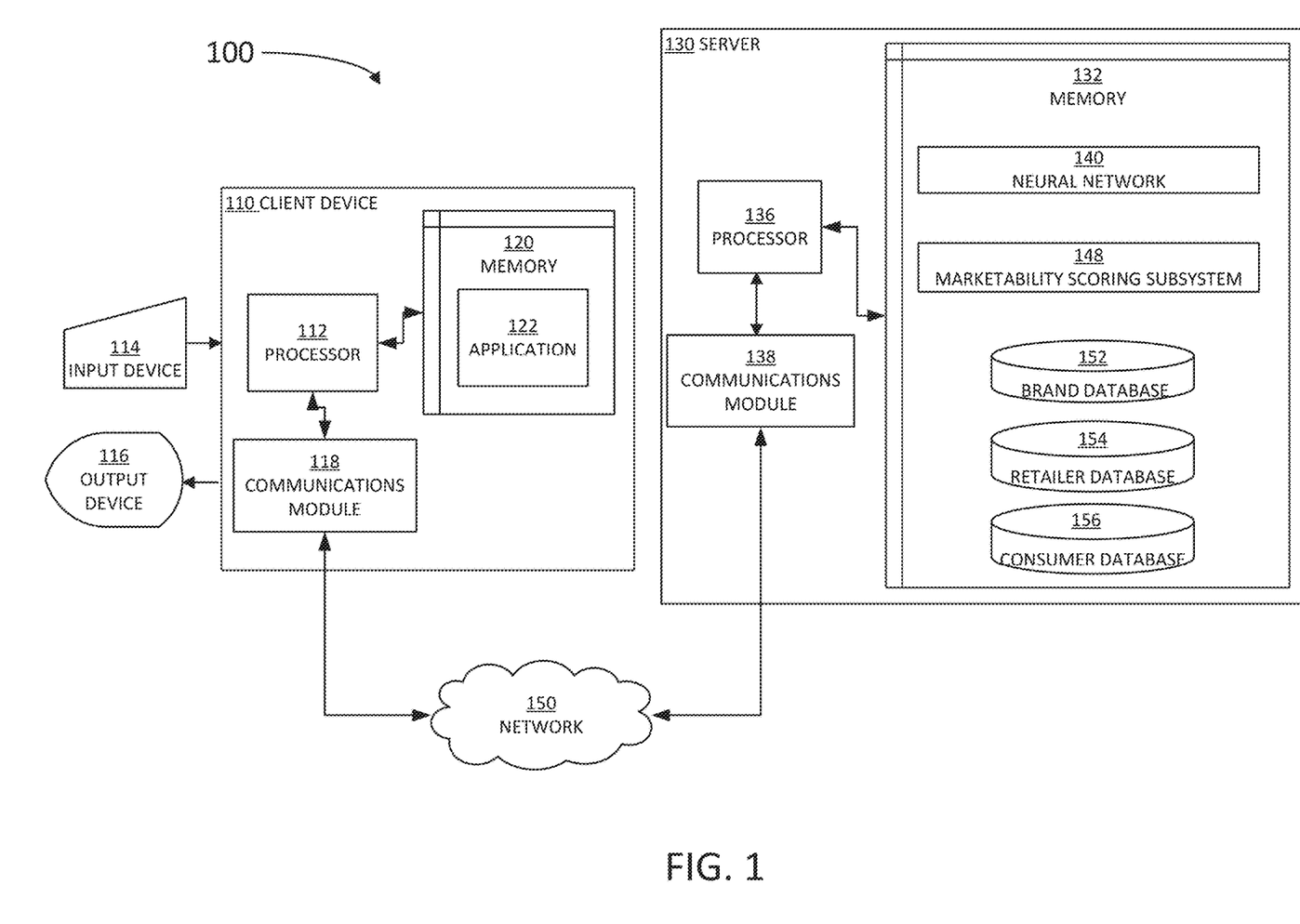
FIG. 1 illustrates an example architecture suitable for marketing branded consumer products, according to some embodiments.

FIG. 1 illustrates an example architecture 100 for marketing branded consumer products, as disclosed herein. Architecture 100 includes a server 130 and a client 110 connected over a network 150. In some embodiments, server 130 is configured to host a memory including instructions which, when executed by a processor 136, cause the server 130 to perform at least some of the steps in methods as disclosed herein. In some embodiments, processor 136 is configured to receive consumer data, purchasing history, purchasing metadata (price history, consumer trends, and the like) from a user through client device 110. Client device 110 may include a processor 112 to execute commands stored in a memory 120. The commands in memory 120 may include an application 122 associated with services provided by server 130. Client device 110 and server 130 exchange data and other information through a communications module 118 in client 110, accessing a network 150, and a communications module 138 in server 130 accessing network 150. The user may be associated with any one of a brand or a retail store for consumer products registered as users of server 130. Further, in some embodiments, processor 136 in server 130 provides client 110 with a marketability analysis result in the form of a chart, a value, or a graphic display illustrating the convenience of certain marketing strategy, or product development.

Server 130 may include any device having an appropriate processor 136, a memory 132, and communications module 138 for performing marketing analysis. Client 110 can be, for example, a desktop computer, a mobile computer, a tablet computer (e.g., including e-book readers), mobile devices (e.g., a smartphone or PDA), or any other devices having appropriate processor 112, memory 120, and communications module 118. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Processor 136 is configured to perform a marketing analysis according to embodiments disclosed herein, executing commands stored in memory 132. In some embodiments, the commands include a neural network algorithm, NN 140. More generally, NN 140 may include any type of non-linear algorithm that uses marketing data such as consumer purchasing data from a retailer or a brand manufacturer, to predict a shopping basket for a consumer or a group of consumers selected from a population. The marketing data may include a log or list of true shopping baskets purchased by one or an aggregated group of consumers over a period of time. Further, some embodiments may also include linear regression algorithms used as a complement to a non-linear NN 140, or a standalone algorithm for certain tasks or applications. In some embodiments, the marketing data provided by the retailer or brand manufacturer through client device 110 is processed by a marketability scoring subsystem 148 and stored in a brand database 152, in a retailer database 154, in a consumer database 156, or any combination of the above. Brand database 152 includes a listing of consumer products classified according to a Brand manufacturer, including a market history of each of the consumer products, for each brand. Retailer database 154 may include a list of consumers, and shopping baskets that have been purchased at a specific retailer store. For example, retailer database 154 may associate a given consumer with a list of shopping baskets (e.g., the consumer product content of the shopping baskets) purchased historically by the consumer at the retail store, including time stamps and value of purchase, as well as shopping baskets purchased by unidentified shoppers. Consumer database 156 may include a list of multiple consumers across different retail stores, including purchasing history of each consumer for one or more retail stores, and one or more Brands.

Marketability scoring subsystem 148 associates a "marketability factor" to each product according to embodiments in the approach disclosed herein. In some embodiments, brand database 152, retailer database 154, and consumer database 156 may be included in memory 132. In some embodiments, at least one of brand database 152, retailer database 154, or consumer database 156 may be external to server 130, but accessible to processor 136 through network 150 and communications module 138. In some embodiments, server 130 may be a datacenter accessible by brands, retail stores, etc. that may be registered to the service. Client device 110 may also be coupled with an input device 114 and an output device 116. Input device 114 may include a mouse, a keyboard, a touchscreen, and the like. Output device 116 may include a display, a touchscreen, a microphone, and the like. In some embodiments, input device 114 and output device 116 may be included in the same unit (e.g., a touchscreen).

Figure 2:
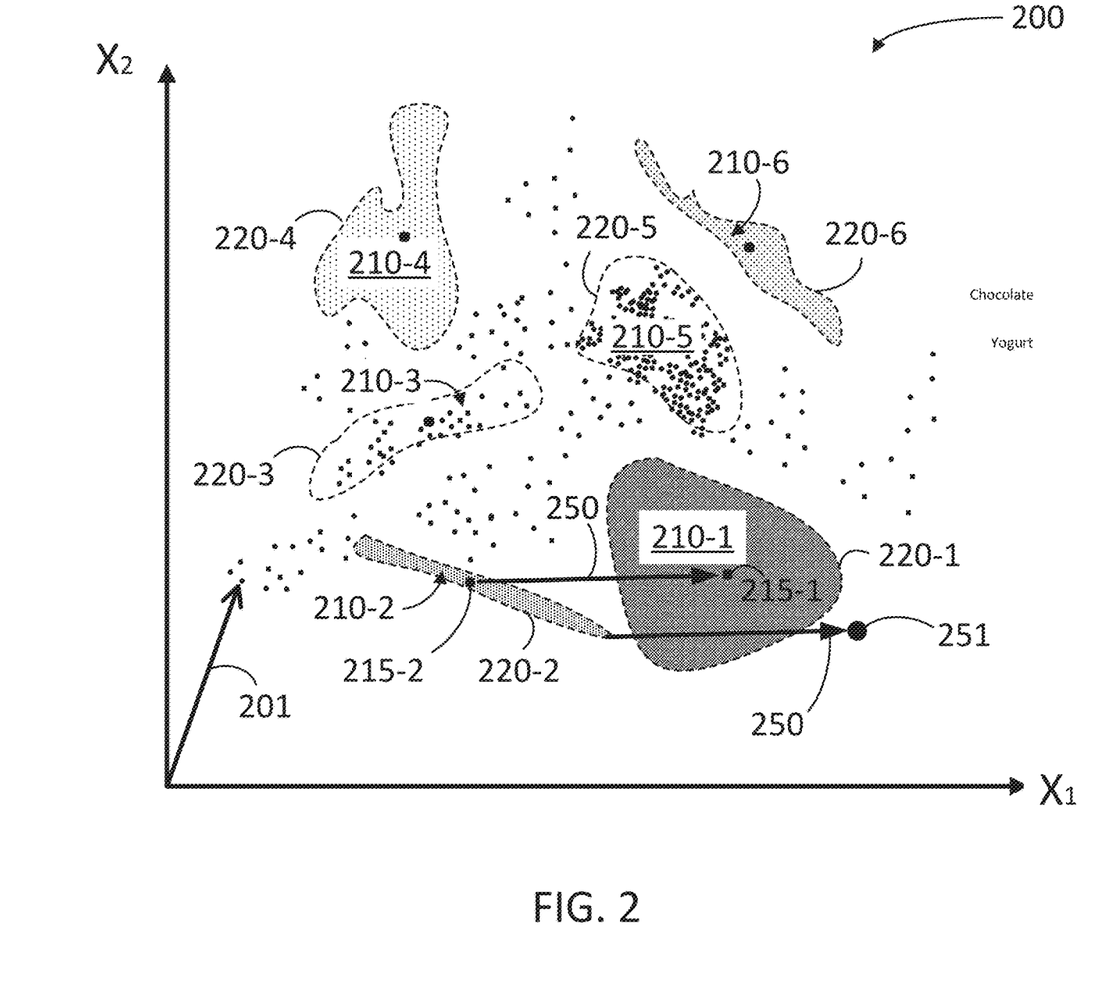
FIG. 2 illustrates a vector space including multiple vectors associated with consumer products, according to some embodiments.

FIG. 2 illustrates a vector space 200 including multiple vectors 201, each vector 201 associated with a consumer product or a basket of products, according to some embodiments. In some embodiments, each vector 201 represents a product according to pre-selected dimensions X1 and X2. In some embodiments, each vector 201 may be associated with a shopping basket for a consumer at a retail store. Accordingly, the classification coordinates X1 and X2 may indicate a type of grocery product present in the shopping basket, and the value of the coordinates (e.g., the projections of embedded vectors 201 onto axes X1 and X2) may indicate an amount of the grocery product that is included in the shopping basket. More generally, dimensions X1 and X2 may include classification factors, classifiers, or properties of multiple consumer products in a retail store. The classification values may be determined by NN 140 upon training over multiple sample data from brand database 152 or retailer database 154. Vector space 200 can have any number of dimensions (e.g., three or more dimensions), and the specific illustration in FIG. 2 may reflect the projection of a multidimensional vector space having more than two dimensions on two arbitrarily selected dimensions X1 and X2.

For example, in some embodiments, NN 140 is trained with historical marketing data from brand database 152 or retailer database 154 to find classifiers such that vectors 201 may be clustered into well defined groups, 210-1, through 210-6 (hereinafter, collectively referred to as clusters 210). For example, cluster 210-1 may include "organic vegetables," cluster 210-2 may include "non-organic vegetables," and cluster 210-3 may include "toiletry," and the like. For each cluster 210, a centroid (e.g., centroid 215-1 or centroid 215-2) and a boundary (e.g., boundary 220-1 through boundary 220-6) may be defined. Vectors 201 may be aggregated in clusters 210 through collaborative filtering in NN 140. In some embodiments, vectors 201 may be aggregated in clusters 210 by a Variational Autoencoder technique, or a Word2Vec/Prod2Vec embedding, (using a continuous skip-gram or continuous bag-of-words based association).

More generally, the number of dimensions of vector space 200 may be larger, or much larger than 2 (X1 and X2). For example, in some embodiments, the number of dimensions of vector space 200 may be three hundred, five hundred, one thousand, or even more dimensions. In some embodiments, at least some clusters 210 may have a dimensionality that is lower than the dimensionality of vector space 200. In some embodiments, an algorithm may be configured to an "orthogonal dimension" to expand the dimensionality of a cluster 210. Accordingly, a cluster 210 may be expanded in the "orthogonal dimension" (e.g., new vectors 201 added along the orthogonal direction) and the algorithm may further determine an effect of such "new" product in terms of value added to a shopping basket, or even in terms of the marketability impact on other product or clusters of consumer products. Clusters 210 may include a first vector 215-1 and a second vector 215-2 within a cluster boundary. In some embodiments, first vector 215-1 may be a centroid of cluster 210-1, and second vector 215-2 may be a centroid of cluster 210-2.

In some embodiments, a discriminator vector 250 may be defined as a the difference between the centroid values of two different clusters. Discriminator vector 250 may define a direction in vector space 200 that classifies a given property or quality of a product. For example, in the specific case of discriminator vector 250 from a second vector 215-2 to a first vector 215-1, the given property may be an "organicity" of a product because discriminator vector 250 separates a non-organic vegetable cluster 210-2 from organic vegetable cluster 210-1. Accordingly, in some embodiments, adding vector 250 to any vector in cluster 210-2 leads to a vector which may or may not be in vegetable cluster 210-1 that matches or closely corresponds to an existing organic version of the product represented by the base vector. For example, when discriminator vector 250 is added to an apple vector in cluster 210-2, the resulting vector, which may or may not be within boundary 220-1 of cluster 210-1, may be associated to a product for organically grown apples.

In some aspects, cluster 210-2 may include "plain-flavored" consumer products, and cluster 210-1 may include "chocolate-flavored" consumer products, then subtracting the centroid vectors 215-1 and 215-2 gives a vector 250a that can be interpreted as "add chocolate flavor." Addition of vector 250a to another vector in cluster 210-2, say for plain flavored Greek yogurt, may result in a new, "synthetic," non-existent consumer product that would represent "chocolate-flavored Greek Yogurt" and is represented by embedded vector 251. In some embodiments, more than one discriminator vector 250a may be applied to create multi-dimensional synthetic consumer products (e.g., 18-oz, chocolate, organic, low-sugar, value-priced Greek yogurt).

In some embodiments, vector space 200 for consumer products may be combined with a basket prediction engine that can predict a consumer demand for a consumer product based on the embedding vector 201 for that product (whether the product is a synthetic product or a real product). Furthermore, in some embodiments embedding vector 201 may represent an entire product basket including multiple consumer products. In some embodiments, it is desirable that vector space 200 may include embedded vectors 201 that represent consumer products and embedded vectors 201 that represent entire product baskets. Accordingly, in some embodiments, manipulation of consumer products and product baskets may be performed simply by addition and subtraction of vectors in vector space 200.

For example, by looking at the different clusters 210 that are near an embedded vector 250 for a product, a demand for the associated consumer product may be estimated. In some embodiments, the demand for the consumer product may be tailored to a specific consumer, or may be aggregated for a group of consumers across the database (e.g., brand database 152, retailer database 154, or consumer database 156).

In some embodiments, whether embedded vectors 201 represent consumer products or shopping baskets, vector space 200 enables pricing optimization across product lines (e.g., Brands), an overall retail store, or even a group of consumers. Moreover, based on consumer responsiveness to consumer products obtained from vector space 200, retail stores may optimize the assortment of consumer products to offer, and more efficiently stock up inventories.

More generally, adding discriminator vector 250 to any of the vectors cluster 210-2 may result in a vector that does not have a direct correlation with an existing product. Accordingly, in some embodiments, vector space 200 may be sparse. In such configuration, some embodiments may nonetheless find a consumer product having a vector that is close to the sum of an original vector in cluster 210-2 and discriminator vector 250, or the closest vector. In some embodiments, discrimination vector 250 may be obtained by subtracting two product vectors directly, rather than the centorids of two different clusters. For example, a first product vector 201-A for an "onion" may be subtracted from a second product vector 201B for an "organic onion." When that is the case, discriminator vector 250 may indicate a direction for "organic-ness" in vector space 200.

Figure 3:
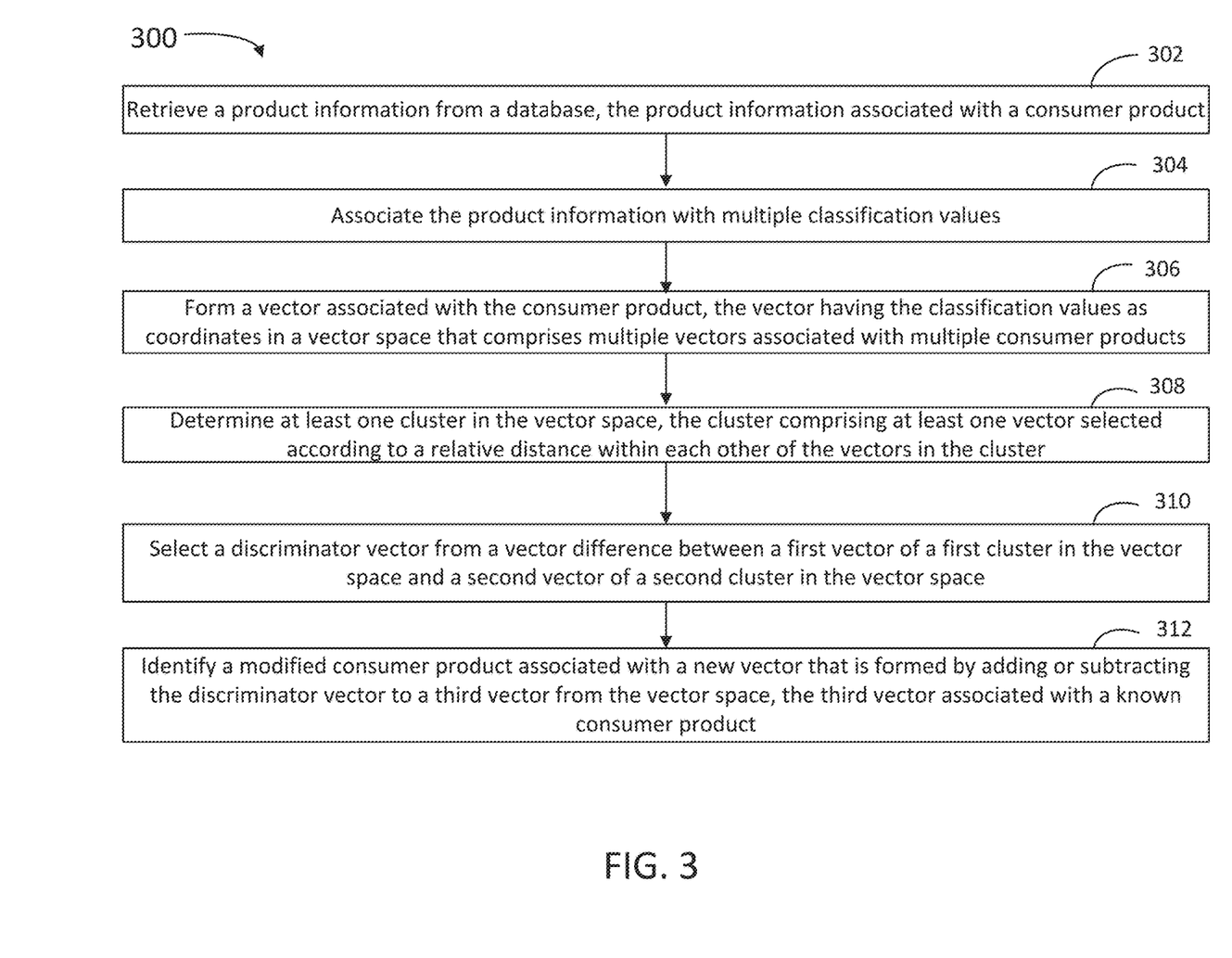
FIG. 3 is a flow chart illustrating steps in a method for marketing consumer products, according to some embodiments.

FIG. 3 illustrates steps in a method 300 for marketing consumer products, according to some embodiments. Method 300 may be performed at least partially by server 130. For example, at least some of the steps in method 300 may be performed by one component in a system including a processor and a memory, wherein the memory includes, or the processor has access to, a brand database, a retailer database, or both (e.g., processor 136, memory 132, brand database 152, retailer database 154, and consumer database 156). Further, the memory may include instructions from a neural network algorithm, or non-linear algorithm, including a machine-learning algorithm (e.g., NN 140 and marketability scoring subsystem 148).

Accordingly, at least some of the steps in method 300 may be performed by a processor executing commands stored in a memory of the server or the mobile device, or accessible by the server or the mobile device. Further, in some embodiments, at least some of the steps in method 300 may be performed overlapping in time, almost simultaneously, or in a different order from the order illustrated in method 300. Moreover, a method consistent with some embodiments disclosed herein may include at least one, but not all, of the steps in method 300.

Step 302 includes retrieving a product information from a database, the product information associated with a consumer product. The database may be the brand database, the retailer database, or both. In some embodiments, step 302 may include retrieving a product information associated with a specific consumer, a type of consumer, or a group of consumers selected across a population. In some embodiments, step 302 may include associating a marketability factor to the product based on the product information, using the marketability scoring subsystem, and storing the marketability factor in the brand database, the retailer database, or both.

Step 304 includes associating the product information with multiple classification values. In some embodiments, step 304 includes training the NN or a machine-learning algorithm to find classifiers that may render efficient data clustering in a vector space. In some embodiments, step 304 includes creating an unsupervised (e.g., automatic, machine driven) clustering of vectors associated with objects according to certain categories selected with the processor from a classification table stored in the memory. In some embodiments, the clustering may be entered by hand by an experienced user. It may be linear optimization, or may be a neural network approach. In some embodiments, step 304 includes using a neural network trained on historical product information from the database. In some embodiments, step 304 includes selecting the classification values based on a consumer history associated with the consumer product, the consumer history retrieved from a brand database or a retailer database.

Step 306 includes forming a vector associated with the consumer product, wherein each of the classification values forms a coordinate of the vector in a vector space that includes multiple vectors associated with multiple consumer products.

Step 308 includes determining at least one cluster in the vector space, the cluster including at least one vector selected according to a relative distance within each other of the vectors in the cluster. In some embodiments, step 308 includes providing to a consumer an offer for a high value consumer product associated with a vector in the first cluster, wherein a shopping basket comprising the high value consumer product has a higher value than a shopping basket comprising the known consumer product.

Step 310 includes selecting a discriminator vector from a vector difference between a a first vector in a first cluster in the vector space and a second vector in a second cluster in the vector space. In some embodiments, one or both of the first and second vectors may include a centroid of the respective cluster. In that regard, the first or the second vectors may or may not correspond to a specific consumer product. Further, in some embodiments, at least one, or both, of the first and second vectors may be specific consumer products (e.g., consumer products selected according to a price, revenue, or inventory optimization criterion). In some embodiments, the discriminator vector may be selected from a vector difference between a first product and a second product, wherein the first and second product may be in the same cluster, or in different clusters in the vector space. In some embodiments, a discriminator vector may be a sum, or a difference of one or more discriminator vectors determined as above. In some embodiments, step 310 includes selecting the discriminator vector and the new vector based on an increased predicted value of a shopping basket that includes the new consumer product.

In some embodiments, the vector space may be "sparse." Accordingly, step 310 may include populating the vector space in selected directions by adding the discriminator vector to one or more product vectors in the vector space. The resulting vectors may be associated with a product not existing in the market. Accordingly, step 310 may include determining new product to occupy a niche market. For example, in some embodiments, step 310 may include a "plain snack foods" cluster and a "BBQ flavor snack foods" cluster. Further, step 310 may include forming a discriminator vector between the centroids of the "plain snack foods" cluster and the "BBQ flavor snack foods" cluster, having a semantic interpretation as "BBQ flavored." Step 310 may include forming a second discriminator vector between the "plain snack foods" cluster and a "Bacon flavored snack foods" cluster. In addition, step 310 may include forming a third discriminator vector between the "plain snack foods" cluster and a "king-sized candy bar" cluster. Accordingly, step 310 may also include adding the first, second, and third discrimination vectors to a specific product (e.g., peanut KIND bars) or a cluster (all KIND snack bars) to obtain KIND Bar+BBQ Flavor+Bacon Flavor+King Size="BBQ Bacon-flavored King-sized KIND bar." Accordingly, in some embodiments, step 310 may include an algorithmic innovation of consumer products. Product price may also be a dimension which is explicitly manipulated when constructing synthetic variations of a product, including via nonlinear combinations such as by adding 0.5 times the discriminator vector that represents a doubling in price, to synthetically represent a 50% increase in price. More generally, any arbitrary factor of the discriminator vector can be added to any existing consumer product to create a synthetic consumer product that includes or excludes a property associated with the discriminator vector to any desired level. For example, this approach may be used to "dial up" or "down" the "spiciness" or "chocolateness" or package size of a given product.

Step 312 includes identifying a modified consumer product associated with a new vector that is formed by adding or subtracting the discriminator vector to a third vector from the vector space, the third vector associated with a known consumer product. The modified consumer product may include a new consumer product, or a known consumer product with a modified characteristic (e.g., a modified price, a modified package, and the like).

In some embodiments, step 312 includes predicting a shopping basket content and a shopping basket value for a consumer product associated with a vector in the vector space. In some embodiments, step 312 may include training a GAN to predict the shopping basket. In a GAN, according to some embodiments, a first neural network may be trained to create a "simulated" shopping basket, and the second, adversarial network may be trained to discriminate between the "simulated" shopping basket and a real shopping basket (e.g., as retrieved from the retailer database). Step 312 may include obtaining a predictor for the shopping basket that a specific consumer, or a sector of the consumer population, may buy. In addition to a GAN network, other approaches in step 312 may include ANY type of shopping basket prediction system, whether a Neural Network-based, linear regression-based, probabilistic, and the like.

In some embodiments, step 312 may include predicting consumer responsiveness. In some embodiments, step 312 includes predicting consumer defection from a retailer or from a brand. Accordingly, step 312 may include aggregating information for a specific consumer from the brand database and the retailer database. In some embodiments, step 312 may further include aggregating information for multiple consumers in a pre-selected section of a population. Further, in some embodiments, step 312 includes predicting marketability of a modified consumer product that a brand or a retailer desires to present to consumers.

Further, in some embodiments, step 312 includes providing signals to the NN algorithm and determining the effect on the predicted shopping basket. Accordingly, in some embodiments, step 312 may include providing signals such as coupons, bargains, campaigns, and promotions associated with one or more consumer products. Other signals provided in step 312 may include pricing changes, assortment changes, or any signal that may be provided to a shopping basket generator to test the impact of the modification. Other signals may be, for example, the temperature (e.g., inside a retailer store), the weather, and other factors provided as input to the NN or machine-learning algorithm. Further, in some embodiments, step 312 may include advertisement campaigns and promotions propagated through selected geographic areas and/or selected sections of a consumer population.

Further, in some embodiments, step 312 may include determining signal effects in the predicted shopping basket, such as the effect of removing a first product from the market and adding a second product on the market on the predicted shopping basket (e.g., "substitution" effect). In some embodiments, step 312 may include determining the effect of changing a price or any other characteristic of a first consumer product on a consumer desirability for a second consumer product located in a proximity of the first product in the vector space—within the same cluster (e.g., a "halo" effect). Further, step 312 may include providing, to the NN or machine-learning algorithm, signals such as pricing changes or the discontinuation of selected consumer products.

Step 312 may include determining signal effects in the predicted shopping basket to increase the value of a shopping basket (e.g., as desirable for a retailer). In some embodiments, Step 312 may include determining signal effects to increase a purchasing rate of a certain product brand (e.g., for a brand manufacturer). In some embodiments, step 312 includes adjusting a price of the consumer product according to an expected value of a shopping basket for an aggregated group of consumers, the expected value based on a value of a shopping basket comprising the known consumer product when the consumer product and the known consumer product belong in a same cluster. In some embodiments, step 312 includes determining a stock value of a retail inventory for the consumer product based on a responsiveness of an aggregated group of consumers to at least one consumer product associated with vectors in a same cluster as the consumer product. In some embodiments, step 312 includes selecting multiple consumer products belonging in different clusters.

Figure 4:
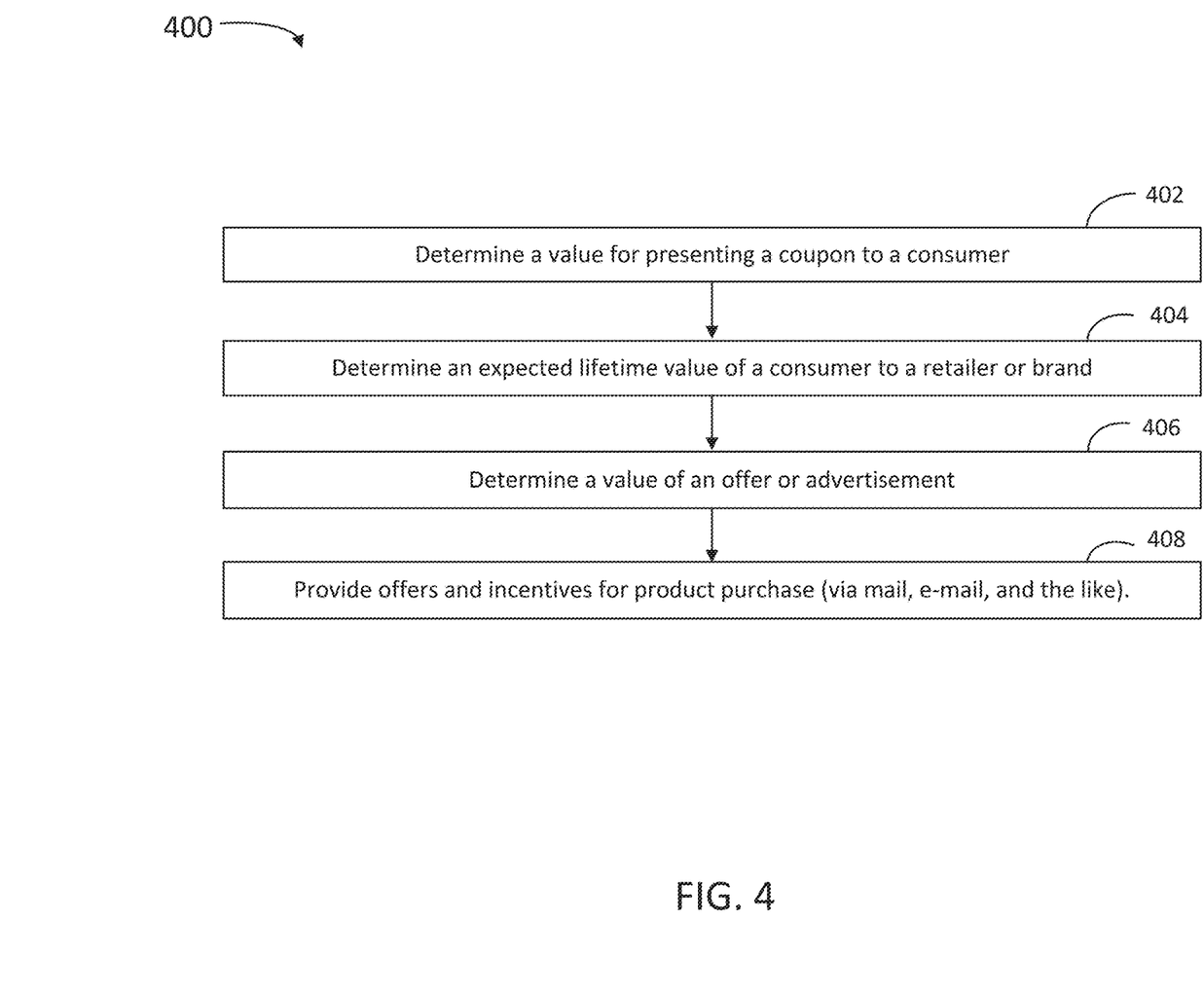
FIG. 4 is a flow chart illustrating steps in a method for marketing consumer products, according to some embodiments.

FIG. 4 illustrates steps in a method 400 for marketing consumer products, according to some embodiments. Method 400 may be performed at least partially by server 130. For example, at least some of the steps in method 400 may be performed by one component in a system including a processor and a memory, wherein the memory includes, or the processor has access to, a brand database, a retailer database, or both (e.g., processor 136, memory 132, brand database 152, retailer database 154, and consumer database 156). Further, the memory may include instructions from a neural network algorithm, or non-linear algorithm, including a machine-learning algorithm (e.g., NN 140 and marketability scoring subsystem 148).

Accordingly, at least some of the steps in method 400 may be performed by a processor executing commands stored in a memory of the server or the mobile device, or accessible by the server or the mobile device. Further, in some embodiments, at least some of the steps in method 400 may be performed overlapping in time, almost simultaneously, or in a different order from the order illustrated in method 400. Moreover, a method consistent with some embodiments disclosed herein may include at least one, but not all, of the steps in method 400.

Step 402 includes determining a value for presenting a coupon to a consumer. In some embodiments, step 402 includes finding a first sum of multiple predicted future shopping baskets for a consumer, including a signal for a coupon or adertisement. Further, step 402 may include finding a second sum of multiple predicted future shopping baskets for a consumer without a signal for a coupon or advertisement. Accordingly, in some embodiments, step 402 includes determining a difference between the first sum and the second sum.

Step 404 includes determining an expected lifetime value (LTV) of a consumer to a retailer or brand.

Step 406 includes determining a value of an offer or advertisement. In some embodiments, step 404 includes simulating multiple shopping baskets with varying signals, including different offer values or advertisements, and determining the value added (or not) by the varying signals to the predicted shopping baskets.

Step 408 includes providing offers and incentives for product purchase to a consumer, based on the LTV and the value of the offer or advertisement. In some embodiments, step 408 includes providing at least one offer via mail, via e-mail, or any other messaging service (electronic or otherwise). In some embodiments, step 408 may include deciding not to spend any resources in providing offers and incentives to a certain consumer, or group of consumers.

In some embodiments, steps 402 through 408 above may be performed for a specific consumer, for a group of consumers, across an entire population of consumers, or across a representative sample of the consumer population, or a selected subset (e.g., platinum-tier shoppers, and the like).

Further, embodiments of method 400 may include performing any one of steps 402 through 408 when considering price and assortment changes, planogram changes, and the like (e.g., for a retailer or brand manufacturer). For example, in some embodiments, any one of steps 402 through 408 may be performed to preview a next week planned circular against a predicted shopping basket (e.g., for the entire consumer population) to predict and plan for sufficient product availability at a retail store. Further, methods consistent with method 400 may include planning price levels for product circulars 6-9 months in advance (e.g., accounting for seasonal consumer behavior, and the like). In some embodiments, steps consistent with method 400 may include anticipating the impact of hurricanes, snowstorms, or heat waves in certain geographically selected areas. In some embodiments, methods consistent with method 400 may be used to simulate new product launches before the product hits the shelf at the retailer store, or to search for likely consumer products that will be successful, then predict the overall sales if they were introduced.

Although many examples provided herein describe a user's search inputs or purchasing history being identifiable, or download history for images being stored, each user may grant explicit permission for such user information to be shared or stored. The explicit permission may be granted using privacy controls integrated into the disclosed system. Each user may be provided notice that such user information will be shared with explicit consent, and each user may at any time terminate the information sharing, and may delete any stored user information. The stored user information may be encrypted to protect user security.

Figure 5:
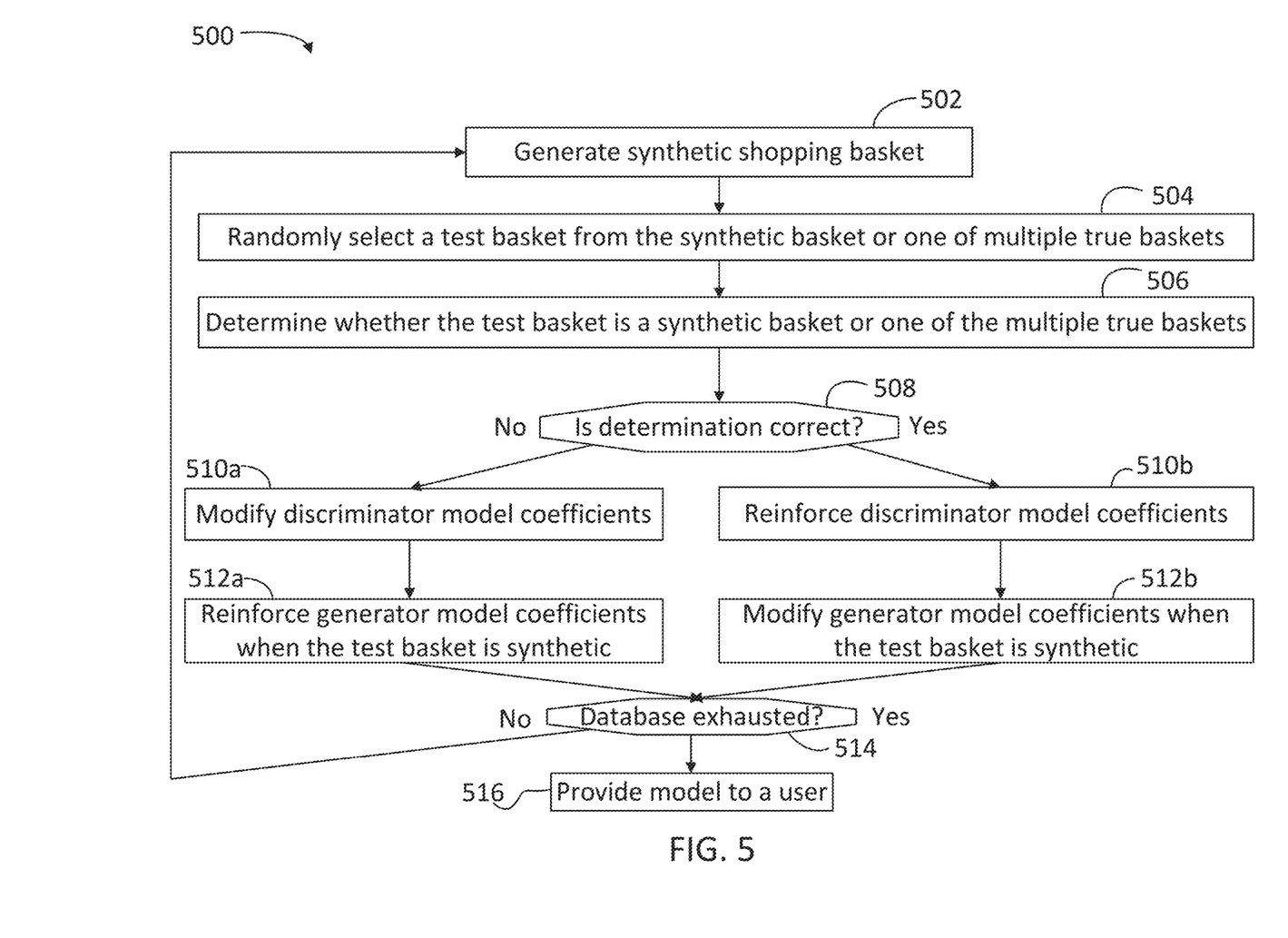
FIG. 5 is a flow chart illustrating steps in a method for predicting a content of a consumer basket, according to some embodiments.

FIG. 5 is a flow chart illustrating steps in a method for predicting a content of a consumer basket, according to some embodiments. Method 500 may be performed at least partially by server 130. For example, at least some of the steps in method 500 may be performed by one component in a system including a processor and a memory, wherein the memory includes, or the processor has access to, a brand database, a retailer database, or both (e.g., processor 136, memory 132, brand database 152, retailer database 154, and consumer database 156). Further, the memory may include instructions from a neural network algorithm, or non-linear algorithm, including a machine-learning algorithm (e.g., NN 140 and marketability scoring subsystem 148).

Accordingly, at least some of the steps in method 500 may be performed by a processor executing commands stored in a memory of the server or the mobile device, or accessible by the server or the mobile device. Further, in some embodiments, at least some of the steps in method 500 may be performed overlapping in time, almost simultaneously, or in a different order from the order illustrated in method 300.

Moreover, a method consistent with some embodiments disclosed herein may include at least one, but not all, of the steps in method 500.

In some embodiments, method 500 may be illustrated using Table I, below. The first column in Table I indicates the time sequence of each of multiple trips of a consumer to a grocery store, with the specific time elapsed since the last trip indicated "n" in the second column. Each row indicates the content of a consumer shopping basket on each trip, wherein the columns to the right of the number of days since last trip indicate a coordinate of an n-dimensional vector representing the shopping basket. Each of the coordinates from "0" to "n" may indicate a classification indicative of a type of product such as may be found in a shopping basket at a consumer store, e.g., produce (coordinate 0), meats (coordinate 1), healthcare (coordinate k, k<n), through dairy (coordinate n). Accordingly, on the first recorded trip to the grocery store 6 days before, the consumer bought 1.1 of meats, 0.1 of sweets, and 0.6 of dairy. Similar results are tabulated for the next x trips to the grocery store by the consumer, until the current trip (T0). Thus, in some embodiments, method 500 predicts the contents of the shopping basket for the consumer on the next trip to the grocery store (T1), before the trip actually occurs.

TABLE 1

| Trip | Days since last trip | 0 | 1 | 2 | ... | n |
|---|---|---|---|---|---|---|
| $T_{-x}$ | 6 | 0.0 | 1.1 | 0.1 | ... | 0.6 |
| ... | ... | ... | ... | ... | ... | ... |
| $T_{-3}$ | 2 | 0.2 | 0.0 | 0.0 | ... | 1.9 |
| $T_{-2}$ | 5 | 0.1 | 0.1 | 0.1 | ... | 1.2 |
| $T_{-1}$ | 4 | 0.0 | 0.0 | 1.3 | ... | 1.1 |
| $T_0$ | 5 | 0.0 | 0.0 | 0.6 | ... | 2.2 |
| $T_1$ | ? | ? | ? | ? | ? | ? |

The values in the cells in Table I are arbitrary values obtained in the context of the range of possible values of a given dimension in particular, as obtained by the classification technique (e.g., NN 140, or Autoencoder or Word2Vec). In some embodiments, it may be desirable to select a combination of the values in the dimensions '0' to 'n' in Table I, such that they represent meaningful quantities indicative, for example, of a department in the store ('Meat,' 'Dairy,' 'Paper Goods,' 'Produce' and the like), and an amount of money spent by the consumer in the trip indicated by the first column. In some embodiments, it is desirable for dimensions '0' to 'n' to be the same for a consumer product as for a product basket to allow for a direct mapping between a product basket prediction and the attributes of the consumer products that make up the product basket.

Step 502 includes generating a synthetic shopping basket, such as shown in row T1 of table 2.

TABLE 2

| Trip | Days since last trip | 0 | 1 | 2 | ... | n |
|---|---|---|---|---|---|---|
| $T_{-x}$ | 6 | 0.0 | 1.1 | 0.1 | ... | 0.6 |
| ... | ... | ... | ... | ... | ... | ... |
| $T_{-3}$ | 2 | 0.2 | 0.0 | 0.0 | ... | 1.9 |
| $T_{-2}$ | 5 | 0.1 | 0.1 | 0.1 | ... | 1.2 |
| $T_{-1}$ | 4 | 0.0 | 0.0 | 1.3 | ... | 1.1 |
| $T_0$ | 5 | 0.0 | 0.0 | 0.6 | ... | 2.2 |
| $T_1$ | 4 | 0.2 | 0.0 | 0.7 | ... | 1.3 |

Step 504 includes randomly selecting a test basket from the synthetic basket or one of multiple true baskets retrieved from a consumer history in the brand database or the retailer database (cf. row $T_1$ in Table 3).

TABLE 3

| Trip | Days since last trip | 0 | 1 | 2 | ... | n |
|---|---|---|---|---|---|---|
| $T_{-x}$ | 6 | 0.0 | 1.1 | 0.1 | ... | 0.6 |
| ... | ... | ... | ... | ... | ... | ... |
| $T_{-3}$ | 2 | 0.2 | 0.0 | 0.0 | ... | 1.9 |
| $T_{-2}$ | 5 | 0.1 | 0.1 | 0.1 | ... | 1.2 |
| $T_{-1}$ | 4 | 0.0 | 0.0 | 1.3 | ... | 1.1 |
| $T_0$ | 5 | 0.0 | 0.0 | 0.6 | ... | 2.2 |
| $T_1$ | 3 | 0.1 | 0.0 | 0.8 | ... | 1.0 |

It can be seen that the prediction for shopping content $T_1$ after step 504 is close to the true shopping basket (e.g., the numerical values on each column of the last row in Table 3 are similar to those of the last row in Table 2).

Step 506 includes determining, with the model, whether the test basket is a synthetic basket or one of the multiple true baskets.

In some embodiments, step 506 is part of a feedback loop that causes step 502 (the "Generator, G") to produce convincing synthetic baskets, and challenges step 506 (the "Discriminator, D") to accurately distinguish between synthetic and real, historic baskets.

Accordingly, step 508 includes testing whether the determination in step 506 is correct. When step 508 resolves that the determination in step 506 is incorrect (e.g., a true basket is confused as synthetic, or a synthetic basket is confused as a true basket), then step 510a includes modifying model coefficients in the discriminator, D (step 506). In some embodiments, step 510a includes leaving the generator model, G (step 502) unchanged if the test basket was a true basket. Further, when the determination in step 506 is incorrect and the test basket was a synthetic basket, then step 512 includes reinforcing the model coefficients in the generator model, G (step 502). Eventually, step 502 will be able to generate synthetic baskets that are indistinguishable from real baskets sampled from transaction data, and it will be, by definition, an excellent predictor of shopping behavior.

Accordingly, when step 508 resolves that the determination in step 506 is correct (e.g., a true basket is identified as a true basket, or a synthetic basket is identified as a synthetic basket), step 510b includes reinforcing the model coefficients in the discriminator, D (step 506). In some embodiments, step 510b includes leaving the generator model, G (step 502) unchanged if the test basket was a true basket. Moreover, when the determination in step 506 is correct and the test basket was a synthetic basket, step 512b includes modifying model coefficients in the generator model, G (step 502).

Step 514 includes querying whether the retailer database or the brand database including the true shopping basket has been exhausted. When step 514 indicates that the retailer database or the retailer database have not been exhausted (e.g., one or more true shopping baskets remain to be tested and correctly predicted), then method 500 is repeated from step 502. When step 514 indicates that the retailer database or the brand database are exhausted and no more true shopping baskets are left without testing, then step 516 includes providing the model to a user.

Hardware Overview

Figure 6:
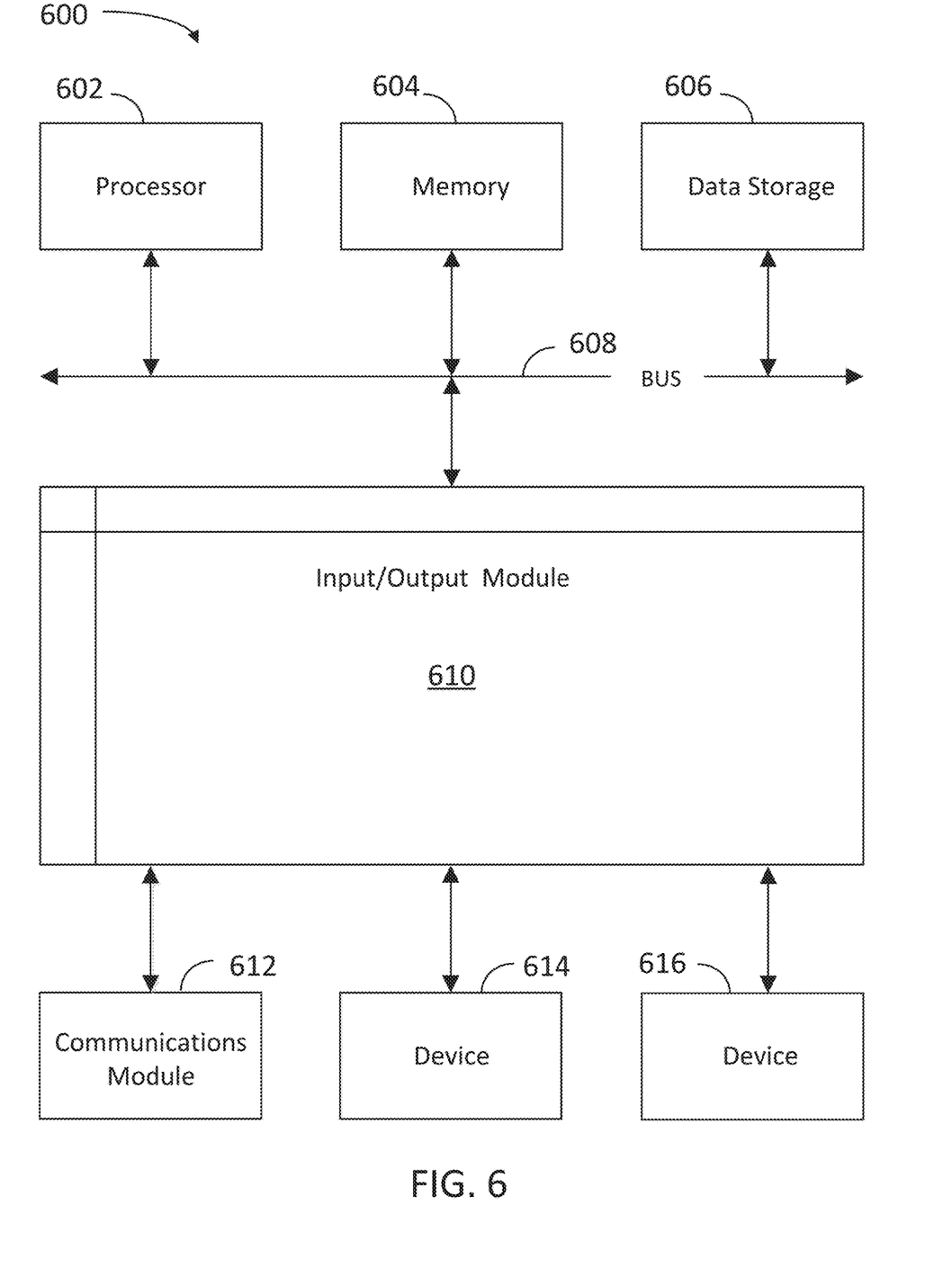
FIG. 6 is a block diagram illustrating an example computer system with which the client and network device of FIG. 1 and the methods of FIGS. 3-5 can be implemented.

FIG. 6 is a block diagram illustrating an example computer system 600 with which the client and network device of FIG. 1 and the methods of FIGS. 3-5 can be implemented. In certain aspects, computer system 600 may be implemented using hardware or a combination of software and hardware, either in a dedicated network device, or integrated into another entity, or distributed across multiple entities.

Computer system 600 (e.g., client device 110 and network device 130) includes a bus 608 or other communication mechanism for communicating information, and a processor 602 (e.g., processors 212 and 236) coupled with bus 608 for processing information. By way of example, the computer system 600 may be implemented with one or more processors 602. Processor 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604 (e.g., memories 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program consumer products, e.g., one or more modules of computer program instructions encoded on a computer readable medium for execution by, or to control the operation of, the computer system 600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. Input/output module 610 can be any input/output module. Exemplary input/output modules 610 include data ports such as USB ports. The input/output module 610 is configured to connect to a communications module 612. Exemplary communications modules 612 (e.g., communications modules 118 and 138) include networking interface cards, such as Ethernet cards and modems. In certain aspects, input/output module 610 is configured to connect to a plurality of devices, such as an input device 614 (e.g., input device 114) and/or an output device 616 (e.g., output device 116). Exemplary input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 616 include display devices, such as an LCD (liquid crystal display) monitor, for displaying information to the user.

According to one aspect of the present disclosure, the client device 110 and network device 130 can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data network device, or that includes a middleware component, e.g., an application network device, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 600 can include clients and network devices. A client and network device are generally remote from each other and typically interact through a communication network. The relationship of client and network device arises by virtue of computer programs running on the respective computers and having a client-network device relationship to each other. Computer system 600 can be, for example, and without limitation, a desktop computer, laptop computer, or tablet computer. Computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires forming bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

In one aspect, a method may be an operation, an instruction, or a function and vice versa. In one aspect, a claim may be amended to include some or all of the words (e.g., instructions, operations, functions, or components) recited in other one or more claims, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software consumer products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method comprising:
   training, to simulate a shopping basket based on a plurality of classification values from a vector space, a first neural network, wherein the vector space comprises multiple vectors, each vector associated with a consumer product having at least one of the plurality of classification values;
   wherein training the first neural network comprises selecting a discriminator vector from a vector difference between a first vector in a first cluster in the vector space and a second vector in a second cluster in the vector space, wherein the discriminator vector is indicative of a direction in the vector space that classifies a desirable attribute of the consumer product;
   training the first neural network according to a consumer data from a selected consumer information or from an aggregated information from a consumer population;
   training, to detect whether or not a shopping basket is simulated or exist in a retailer database, a second neural network;
   determining, with the second neural network, whether the shopping basket from the first neural network passes a threshold value, the threshold value indicative of whether a shopping basket is simulated or not; modifying the first neural network when the shopping basket passes the threshold value; and modifying the second neural network when the shopping basket fails the threshold value.

2. The computer-implemented method of claim 1, wherein modifying one of the first neural network comprises re-enforcing a model coefficient in the first neural network, and modifying the second neural network comprises re-enforcing a model coefficient in the second neural network.

3. The computer-implemented method of claim 1, further comprising determining a responsiveness of an aggregated group of consumers to the consumer product by verifying an inclusion of the consumer product in the shopping basket for each consumer in the aggregated group of consumers.

4. The computer-implemented method of claim 1, further comprising determining a change in a responsiveness of an aggregated group of consumers to a first consumer product by verifying an inclusion of a second consumer product in the shopping basket for each consumer in the aggregated group of consumers.

5. The computer-implemented method of claim 1, wherein training the first neural network or the second neural network comprises determining a change of desirability for a first product in the shopping basket by adjusting a product feature of a second product in the shopping basket.

6. The computer-implemented method of claim 1, wherein training the first neural network according to a consumer data comprises identifying a modified consumer product associated with a new vector that is formed by adding or subtracting a discriminator vector to a third vector from the vector space, the third vector associated with a known consumer product, wherein the modified consumer product is selected from a test basket.

7. The computer-implemented method of claim 1, wherein modifying the first neural network comprises providing a signal to the first neural network and determining a change in the shopping basket responsive to the signal, wherein the signal includes at least one of a coupon a bargain or a promotion associated with one or more consumer products.

8. The computer-implemented method of claim 1, wherein modifying the first neural network comprises providing a signal to the first neural network and determining a change in the shopping basket responsive to the signal, wherein the signal includes one of an environmental factor, a geographic factor, or a demographic factor.

9. The computer-implemented method of claim 1, wherein modifying the first neural network comprises providing a signal to the first neural network and determining a change in the shopping basket responsive to the signal, wherein the signal includes a substitution of a first product with a second product in the shopping basket.

10. A system, comprising:
one or more processors; and
a memory storing instructions which, when executed by the one or more processors, cause the system to perform operations, comprising to:
train, to simulate a shopping basket based on a plurality of classification values from a vector space, a first neural network, wherein the vector space comprises multiple vectors, each vector associated with a consumer product having at least one of the plurality of classification values;
wherein to train the first neural network the one or more processors execute instructions to select a discriminator vector from a vector difference between a first vector in a first cluster in the vector space and a second vector in a second cluster in the vector space, wherein the discriminator vector is indicative of a direction in the vector space that classifies a desirable attribute of the consumer product;
train the first neural network according to a consumer data from a selected consumer information or from an aggregated information from a consumer population;
train, to detect whether or not a shopping basket is simulated or exist in a retailer database, a second neural network;
determine, with the second neural network, whether the shopping basket from the first neural network passes a threshold value, the threshold value indicative of whether a shopping basket is simulated or not;
modify the first neural network when the shopping basket passes the threshold value; and modify the second neural network when the shopping basket fails the threshold value.

11. The system of claim 10, wherein modifying one of the first neural network comprises re-enforcing a model coefficient in the first neural network, and modifying the second neural network comprises re-enforcing a model coefficient in the second neural network.

12. The system of claim 10, wherein the one or more processors further execute instructions to determine a responsiveness of an aggregated group of consumers to the consumer product and verify an inclusion of the consumer product in the shopping basket for each consumer in the aggregated group of consumers.

13. The system of claim 10, wherein the one or more processors further execute instructions to determine a change in a responsiveness of an aggregated group of consumers to a first consumer product and verify an inclusion of a second consumer product in the shopping basket for each consumer in the aggregated group of consumers.

14. The system of claim 10, wherein to train the first neural network or the second neural network the one or more processors execute instructions to determine a change of desirability for a first product in the shopping basket by adjusting a product feature of a second product in the shopping basket.

15. The system of claim 10, wherein to train the first neural network according to a consumer data the one or more processors execute instructions to identify a modified consumer product associated with a new vector that is formed by adding or subtracting a discriminator vector to a third vector from the vector space, the third vector associated with a known consumer product, wherein the modified consumer product is selected from a test basket.

16. The system of claim 10, wherein to modify the first neural network the one or more processors execute instructions to provide a signal to the first neural network and to determine a change in the shopping basket responsive to the signal, wherein the signal includes at least one of a coupon a bargain or a promotion associated with one or more consumer products.

17. The system of claim 10, wherein to modify the first neural network the one or more processors execute instructions to provide a signal to the first neural network and determining a change in the shopping basket responsive to the signal, wherein the signal includes one of an environmental factor, a geographic factor, or a demographic factor.

18. The system of claim 10, wherein to modify the first neural network the one or more processors execute instructions to provide a signal to the first neural network and determining a change in the shopping basket responsive to the signal, wherein the signal includes a substitution of a first product with a second product in the shopping basket.

* * * * *